United States Patent
Jang et al.

(10) Patent No.: US 10,420,014 B2
(45) Date of Patent: Sep. 17, 2019

(54) METHOD AND DEVICE FOR CONTROLLING USE OF EXTERNAL DATA NETWORK VIA MOBILE ACCESS POINT

(71) Applicant: Samsung Electronics Co., Ltd., Suwon-si, Gyeonggi-do (KR)

(72) Inventors: Keum-Ju Jang, Seoul (KR); Su-Young Park, Bucheon-si (KR); Sun-Min Hwang, Hwaseong-si (KR); Ju-Seung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/491,555

(22) Filed: Apr. 19, 2017

(65) Prior Publication Data

US 2017/0223606 A1 Aug. 3, 2017

Related U.S. Application Data

(63) Continuation of application No. 14/197,825, filed on Mar. 5, 2014, now Pat. No. 9,642,001.

(30) Foreign Application Priority Data

Mar. 14, 2013 (KR) ........................ 10-2013-0027577

(51) Int. Cl.
*H04W 4/80* (2018.01)
*H04W 4/00* (2018.01)
(Continued)

(52) U.S. Cl.
CPC ............ *H04W 48/02* (2013.01); *H04W 4/00* (2013.01); *H04W 4/80* (2018.02); *H04W 8/22* (2013.01);
(Continued)

(58) Field of Classification Search
CPC ..... H04W 88/04; H04W 12/08; H04W 12/06; H04W 4/008
See application file for complete search history.

(56) References Cited

U.S. PATENT DOCUMENTS 6,697,355 B1 2/2004 Lim
7,672,695 B1 3/2010 Rainnie et al.
(Continued)

FOREIGN PATENT DOCUMENTS

CN 101541068 B 1/2011
CN 102970675 A 3/2013
(Continued)

OTHER PUBLICATIONS

Samsung Galaxy Tab(tm) 10.1—Android Tablet—User Manual; Mar. 22, 2012, XP 055116340.

*Primary Examiner* — Dung Hong
(74) *Attorney, Agent, or Firm* — Jefferson IP Law, LLP (57) ABSTRACT

A method and a device for controlling external data network use via a mobile Access Point (AP) are provided. A host device set as the mobile AP determines whether a data-less mode is set, blocks a client device from using the external data network via the mobile AP, if the data-less mode is set, and permits the client device to use the external data network via the mobile AP, if the data-less mode is released. A client device connected to a mobile AP determines whether a data-less mode is set for a host device set as the mobile AP, if the client device is connected to the host device in a state of being connected to a wireless data network, maintains the connection to the wireless data network, if the data-less mode is set, and releases the connection to the wireless data network, if the data-less mode is released.

20 Claims, 7 Drawing Sheets

(51) Int. Cl.
  *H04W 8/22* (2009.01)
  *H04W 68/00* (2009.01)
  *H04W 76/11* (2018.01)
  *H04W 76/14* (2018.01)
  *H04W 76/30* (2018.01)
  *H04W 84/12* (2009.01)
  *H04W 88/10* (2009.01)
  *H04W 48/02* (2009.01)
  H04L 12/26 (2006.01)
  H04M 15/00 (2006.01)
  H04M 15/02 (2006.01)
  H04L 12/14 (2006.01)

(52) U.S. Cl.
  CPC ............ *H04W 76/11* (2018.02); *H04W 76/14* (2018.02); *H04W 76/30* (2018.02); *H04W 84/12* (2013.01); *H04W 88/10* (2013.01); *H04L 12/145* (2013.01); *H04L 12/1435* (2013.01); *H04L 43/10* (2013.01); *H04M 15/39* (2013.01); *H04M 15/888* (2013.01); *H04W 68/00* (2013.01)

(56) References Cited

U.S. PATENT DOCUMENTS

| | | | |
|---|---|---|---|
| 8,208,975 B1 | 6/2012 | Rainnie et al. | |
| 8,831,517 B2 | 9/2014 | Shankaranarayanan | |
| 8,949,439 B1* | 2/2015 | Sahuguet | H04W 88/04 709/227 |
| 2003/0046701 A1* | 3/2003 | O'Donnell | H04N 7/173 725/76 |
| 2003/0210700 A1* | 11/2003 | Chen | H04W 88/00 370/401 |
| 2005/0226423 A1 | 10/2005 | Li et al. | |
| 2007/0153984 A1 | 7/2007 | Bloebaum et al. | |
| 2008/0069047 A1 | 3/2008 | Yee et al. | |
| 2009/0204815 A1* | 8/2009 | Dennis | H04L 63/1416 713/168 |
| 2009/0325576 A1 | 12/2009 | Moreillon | |
| 2010/0188975 A1 | 7/2010 | Raleigh | |
| 2011/0283001 A1* | 11/2011 | Jung | H04W 28/16 709/227 |
| 2011/0294502 A1* | 12/2011 | Oerton | H04W 72/10 455/426.1 |
| 2012/0054353 A1* | 3/2012 | Jung | H04W 88/04 709/227 |
| 2012/0079080 A1* | 3/2012 | Pishevar | A63F 13/12 709/220 |
| 2012/0096132 A1* | 4/2012 | Lim | H04L 12/66 709/220 |
| 2012/0240197 A1* | 9/2012 | Tran | H04L 63/1416 726/4 |
| 2012/0264375 A1* | 10/2012 | Shankaranarayanan | H04L 12/1475 455/41.2 |
| 2012/0265898 A1* | 10/2012 | Kruglick | H04L 47/24 709/235 |
| 2013/0051314 A1 | 2/2013 | Ong et al. | |
| 2013/0182693 A1* | 7/2013 | Sperling | H04W 52/0229 370/338 |
| 2013/0217330 A1* | 8/2013 | Gardenfors | H04M 1/7253 455/41.2 |
| 2013/0254264 A1* | 9/2013 | Hankinson | H04L 29/06047 709/203 |
| 2013/0318159 A1* | 11/2013 | Earnshaw | H04N 1/00347 709/204 |
| 2013/0331028 A1* | 12/2013 | Kuehnel | H04W 76/10 455/41.1 |
| 2013/0331141 A1* | 12/2013 | Montemurro | H04W 48/18 455/515 |
| 2014/0053243 A1* | 2/2014 | Walsh | H04L 63/0236 726/4 |
| 2014/0087654 A1* | 3/2014 | Kiveisha | H04B 5/0031 455/41.1 |

FOREIGN PATENT DOCUMENTS

| | | |
|---|---|---|
| EP | 2 249 514 A1 | 11/2010 |
| EP | 2 403 226 A1 | 1/2012 |
| KR | 10-0652336 B1 | 11/2006 |
| KR | 10-2012-0019520 A | 3/2012 |
| KR | 10-1361823 B1 | 2/2014 |
| WO | 2008/066928 A2 | 6/2008 |

* cited by examiner

METHOD AND DEVICE FOR CONTROLLING USE OF EXTERNAL DATA NETWORK VIA MOBILE ACCESS POINT

PRIORITY

This application is a continuation application of prior application Ser. No. 14/197,825, filed on Mar. 5, 2014, and claimed the benefit under 35 U.S.C. § 119(a) of a Korean patent application filed on Mar. 14, 2013 in the Korean Intellectual Property Office and assigned Serial No. 10-2013-0027577, the entire disclosure of each of which is hereby incorporated by reference.

BACKGROUND OF THE INVENTION

1. Field of the Invention

The present disclosure relates to a method and a device for controlling use, by a client device, of an external data network via a mobile Access Point (AP).

2. Description of the Related Art

Various types of mobile devices supporting a Wireless Local Area Network (WLAN) connection, such as Wireless-Fidelity (Wi-Fi), have recently been released to the market. However, due to mobility limitation of the WLAN, users cannot use the WLAN while moving.

Recently, some types of mobile terminals, such as smart phones, include a mobile AP function. The mobile AP function allows a mobile terminal to be used as a mobile AP. The mobile AP function uses a wireless capability to implement a tethering function which enables a device, such as a Personal Computer (PC), to connect to a mobile AP and to access a network (e.g. the Internet) via a wireless data network, such as a wireless data network based on a General Packet Radio Service (GPRS), a Wideband Code Division Multiple Access (WCDMA), or a Long Term Evolution (LTE), with which the mobile AP is registered. The mobile AP function is also typically referred to as 'Wi-Fi tethering', 'Wi-Fi hotspot', or 'portable hotspot'.

Once a mobile AP function is set, a mobile terminal equipped with the mobile AP function operates as a mobile AP and a hotspot is formed around the mobile AP. In the formed hotspot, at least one device connected with the mobile AP may communicate with the mobile AP and also connect to a wireless data network via the mobile AP to access a network (e.g. the Internet). In this case, the mobile terminal which is set as the mobile AP, such as a smart phone, may be referred to as a host device, and a device which is connected with the mobile AP, such as a laptop computer, a tablet computer, or a smart phone, may be referred to as a client device. For connection between the mobile AP (host device) and the client device, a wireless short-range communication, such as a WLAN, a Bluetooth, or a Radio Frequency Identification (RFID), may be used. Generally, Wi-Fi, which is a WLAN, is widely used for connection between a mobile AP and a client device.

A billing system for a wireless data network generally charges users based on the amount of data (e.g. number of packets) transmitted. Thus, when a user of a mobile terminal desires to access a network (e.g. the Internet), the user may prefer to access the Internet by using a WLAN instead of using a wireless data network with which the mobile terminal is registered, if the WLAN, which is connected with a low-rate or free external data network, such as a wired data network, is available. For example, the mobile terminal's user connects the mobile terminal to a WLAN AP which may access the Internet via the external data network, and accesses the Internet by using the external data network via the connected WLAN AP.

When a mobile terminal connected with a wireless data network is connected to a WLAN AP and thus may use an external data network via the WLAN AP, the mobile terminal typically releases connection with the wireless data network. Thereafter, if the mobile terminal cannot use the external data network via the WLAN AP any longer, the mobile terminal releases connection to the WLAN AP and connects back to the wireless data network.

Similarly, when a mobile terminal, such as a smart phone, connected with a wireless data network is connected to a mobile AP as a client device, the client device typically releases connection with the wireless data network. In this state, if access to the Internet is required, the client device may access the Internet by using an external data network through the mobile AP, instead of using the connection-released wireless data network.

The above information is presented as background information only to assist with an understanding of the present disclosure. No determination has been made, and no assertion is made, as to whether any of the above might be applicable as prior art with regard to the present invention.

SUMMARY OF THE INVENTION

As such, when the client device is connected to the mobile AP, access of the client device to the Internet is made by using the external data network of the mobile AP at all times. As a result, a billing target for use of the external data network by the client device is the mobile terminal which operates as a host device. If the external data network of the mobile AP is the external wireless data network, the user of the host device may be charged an additional wireless data fee. More particularly, unless the host device has no burden in the data fee because of subscribing to an unlimited data plan, the user of the host device may be charged an additional wireless data fee for use, by the client device, of the external wireless data network.

Aspects of the present disclosure are to address at least the above-mentioned problems and/or disadvantages and to provide at least the advantages described below. Accordingly, an aspect of the present disclosure is to provide a method and a device for controlling use of an external data network (or external data network use) of a client device via a mobile Access Point (AP).

Another aspect of the present disclosure is to provide a method and a device for selectively blocking or permitting external data network use of a client device via a mobile AP.

Another aspect of the present disclosure is to provide a method and a device for automatically blocking or permitting external data network use of a client device via a mobile AP, according to a state of connection of a host device to the external data network.

Another aspect of the present disclosure is to provide a method and a device for selectively blocking or permitting external data network use of a client device via a mobile AP, by at least one of a host device and the client device.

Another aspect of the present disclosure is to provide a method and a device for selectively blocking or permitting external data network use of a client device via a mobile AP, for at least one of each client device and each data sharing application.

Another aspect of the present disclosure is to provide a method and a device for selectively limiting the amount of use of external data (or an external data usage of a client device via a mobile AP.

Another aspect of the present disclosure is to provide a method and a device for selectively limiting an external data usage of a client device via a mobile AP, for at least one of each client device and each data sharing application.

Another aspect of the present disclosure is to provide a method and a device for allowing a client device to continuously use a previously connected wireless data network if the client device is connected to a mobile AP.

In accordance with an aspect of the present disclosure, a method for controlling external data network use of a client device via a mobile AP by a host device set as the mobile AP is provided. The method includes determining whether a data-less mode is set, blocking the client device from using the external data network via the mobile AP if the data-less mode is set, and permitting the client device to use the external data network via the mobile AP if the data-less mode is released.

In accordance with another aspect of the present disclosure, a method for controlling external data network use via a mobile AP by a client device connected to the mobile AP is provided. The method includes determining whether a data-less mode is set for a host device set as the mobile AP if the client device is connected to the host device in a state of being connected to a wireless data network, maintaining the connection to the wireless data network if the data-less mode is set, and releasing the connection to the wireless data network if the data-less mode is released.

In accordance with another aspect of the present disclosure, a method for controlling external data network use via a mobile AP by a client device of the mobile AP is provided. The method includes determining whether a current operation mode is a data sharing application mode, if the client device is connected to a host device set as the mobile AP in a state of being connected to a wireless data network, maintaining the connection to the wireless data network if the current operation mode is the data sharing application mode, and releasing the connection to the wireless data network if the current operation mode is not the data sharing application mode.

In accordance with another aspect of the present disclosure, a method for controlling external data network use via a mobile AP by a client device connected to the mobile AP is provided. The method includes determining whether a current operation mode is a data sharing application mode, if the client device is connected to a host device set as the mobile AP in a state of being connected to a wireless data network, determining whether a data-less mode is set for the host device, if the current operation mode is the data sharing application mode, maintaining the connection to the wireless data network, if the data-less mode is set, and releasing the connection to the wireless data network, either if the current operation mode is not the data sharing application mode or if the data-less mode is released.

In accordance with another aspect of the present disclosure, a host device set as a mobile AP is provided. The host device includes a wireless short-range communication unit for forming a mobile AP network with a client device based on a wireless short-range communication, a wireless communication unit for performing wireless data communication with a wireless data network, which is an external data network with respect to the mobile AP network, and a controller for blocking the client device from using the wireless data network, if a data-less mode is set, and for permitting the client device to use the wireless data network, if the data-less mode is released.

In accordance with another aspect of the present disclosure, a client device connected to a mobile AP is provided. The client device includes a wireless short-range communication unit for forming a mobile AP network with a host device set as the mobile AP based on a wireless short-range communication, a wireless communication unit for performing a wireless data communication with a wireless data network, and a controller for determining whether a data-less mode is set for the host device, if the client device is connected to the host device in a state of being connected to the wireless data network, for maintaining the connection to the wireless data network, if the data-less mode is set, and for releasing the connection to the wireless data network, if the data-less mode is released.

In accordance with another aspect of the present disclosure, a client device of a mobile AP is provided. The client device includes a wireless short-range communication unit for forming a mobile AP network with a host device set as the mobile AP based on a wireless short-range communication, a wireless communication unit for performing a wireless data communication with a wireless data network, and a controller for determining whether a current operation mode is a data sharing application mode, if the client device is connected to a host device set as the mobile AP in a state of being connected to a wireless data network, for maintaining the connection to the wireless data network, if the current operation mode is the data sharing application mode, and for releasing the connection to the wireless data network, if the current operation mode is not the data sharing application mode.

In accordance with another aspect of the present disclosure, a client device connected to a mobile AP is provided. The client device includes a wireless short-range communication unit for forming a mobile AP network with a host device set as the mobile AP based on a wireless short-range communication, a wireless communication unit for performing a wireless data communication with a wireless data network, and a controller for determining whether a current operation mode is a data sharing application mode, if the client device is connected to a host device set as the mobile AP in a state of being connected to a wireless data network, for determining whether a data-less mode is set for the host device, if the current operation mode is the data sharing application mode, for maintaining the connection to the wireless data network, if the data-less mode is set, and for releasing the connection to the wireless data network, either if the current operation mode is not the data sharing application mode or if the data-less mode is released.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features, and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure.

Descriptions of well-known functions, processes, operations, steps, features, elements, structures and/or constructions may be omitted for clarity and conciseness, and to avoid obscuring the subject matter of the disclosure.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present invention is provided for illustration purpose only and not for the purpose of limiting the invention as defined by the appended claims and their equivalents.

It is to be understood that, through the description and claims of this specification, the singular forms "a," "an," and "the" include plural referents unless the context clearly dictates otherwise. Thus, for example, reference to "a component surface" includes reference to one or more of such surfaces.

Throughout the description and claims of this specification, the words "comprise", "include" and "contain" and variations thereof, for example "comprising" and "comprises", means "including but not limited to", and is not intended to (and does not) exclude other features, elements, components, integers, steps, processes, operations, characteristics, properties and/or groups thereof.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Features, elements, components, integers, steps, processes, operations, functions, characteristics, properties and/or groups thereof described in conjunction with a particular aspect, embodiment or example of the invention are to be understood to be applicable to any other aspect, embodiment or example described herein unless incompatible therewith.

It will be also be appreciated that, throughout the description and claims of this specification, language in the general form of "X for Y" (where Y is some action, process, activity, operation or step and X is some means for carrying out that action, process, activity, operation or step) encompasses means X adapted, configured or arranged specifically, but not exclusively, to do Y.

Exemplary embodiments of the present disclosure will be described based on an example in which a host device, which is set as a mobile Access Point (AP), and a client device connected to the mobile AP are smart phones. However, the host device may comprise any suitable type of device. For example, in certain exemplary embodiments of the present disclosure, other types of devices based on similar technology may be used. Furthermore, the skilled person will appreciate that exemplary embodiments of the present disclosure may be implemented using devices comprising one or more modifications relative to the devices described herein, for example one or more additional components, one or more alternative or equivalent components, and/or one or more components omitted.

Figure 1:
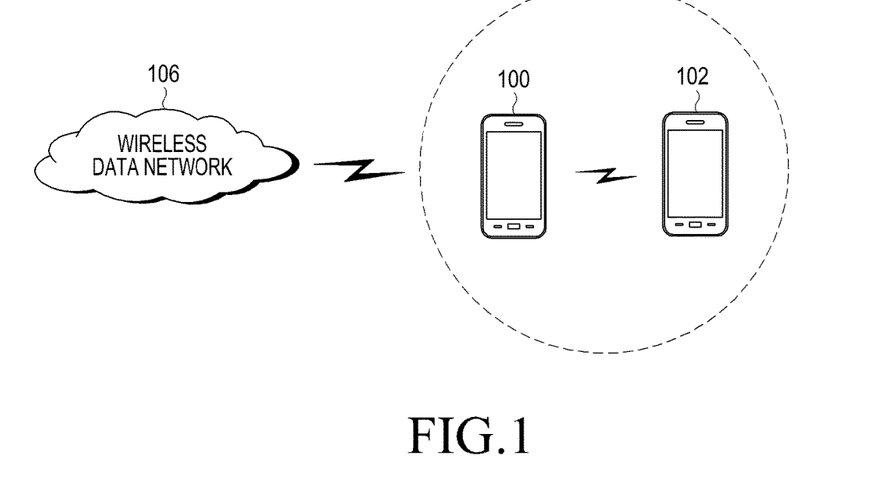
FIG. 1 is a structural diagram illustrating a mobile Access Point (AP) network according to an exemplary embodiment of the present disclosure.

FIG. 1 is a structural diagram illustrating a mobile AP according to an exemplary embodiment of the present disclosure.

Referring to FIG. 1, a mobile AP network 104 is configured with a host device 100 and a client device 102. As a mobile terminal, such as a smart phone, which has a mobile AP function, is set as a mobile AP, it operates as the host device 100 of the mobile AP network 104. Therefore, in exemplary embodiments of the present disclosure, terms 'host device' and 'mobile AP' are interchangeable. The client device 102 may also be a mobile terminal, such as a smart phone, and a device, such as a laptop computer or a tablet computer, may also be the client device 102. Connection between the host device 100 and the client device 102 may use a short-range wireless communication, such as a Wireless Local Area Network (WLAN), Bluetooth, a Radio Frequency Identification (RFID), or the like, and in exemplary embodiments of the present disclosure, Wireless-Fidelity (Wi-Fi), which is a WLAN, is used for the connection between the host device 100 and the client device 102. While only one client device 102 is included in the mobile AP network 104 in FIG. 1, multiple client devices may be included in the mobile AP network 104.

The host device 100 and the client device 102 may share a network (e.g. a public network) with which the host device 100 is registered, such as a General Packet Radio Service (GPRS), a Wideband Code Division Multiple Access (WCDMA), a Long Term Evolution (LTE), or the like. For example, the client device 102 may use a wireless data network 106 through the host device 100. In this way, the client device 102 may use the wireless data network 106 through the host device 100, such that for the client device 102, the wireless data network 106 is an external data network. Simultaneous use of Wi-Fi and the wireless data network 106 may be implemented by a technique used in, for example, a Multi-media Message Service (MMS) application. When the MMS application is used during use of the data network through Wi-Fi, another connection, such as a cellular connection, instead of a default connection, such as Wi-Fi, may be possible by using an Application Program Interface (API) of an application processor of a mobile terminal in the MMS application. If an application which desires to simultaneously use Wi-Fi and the cellular network calls a corresponding API, both types of connection may be used simultaneously.

The host device 100 may also be connected to a fixed AP as well as the wireless data network 106. The fixed AP is an AP connected to a wired data network, and may be a traditional WLAN AP which allows a client connected to the fixed AP through a WLAN to use the wired data network. In this case, the client device 102 may also be used as a wired data network through the host device 100. The wired data network may also be an external data network other than the wireless data network with which the client device 102 is registered. This case will be described later with reference to FIG. 10.

A user of the host device 100 and a user of the client device 102 may share contents through a mobile AP by using a data sharing application. In an example of use of the data sharing application, many people may view the same screen with their respective smart devices. The smart devices may be, for example, a smart TV, a laptop computer, a tablet computer, a smart phone, and the like. Another example of data sharing through a mobile AP may be a multi-player game.

When the host device 100 and the client device 102 are connected to use the data sharing application, the client device 102 may use the external data network, such as the wireless data network 106, through the host device 100. If the client device 102 uses an external data network, the user of the host device 100 may be charged an additional wireless data fee as stated above.

In this regard, for the host device 100, a data-less mode may be set or the set data-less mode may be released. The data-less mode is a mode for controlling use, by the client device 102 via the host device 100, of an external data network. When the data-less mode is set for the host device 100, the host device 100 blocks the client device 102 from using the external data network via the host device 100. When the data-less mode is released, the host device 100 permits the client device 102 to use the external data network via the host device 100.

Figure 2:
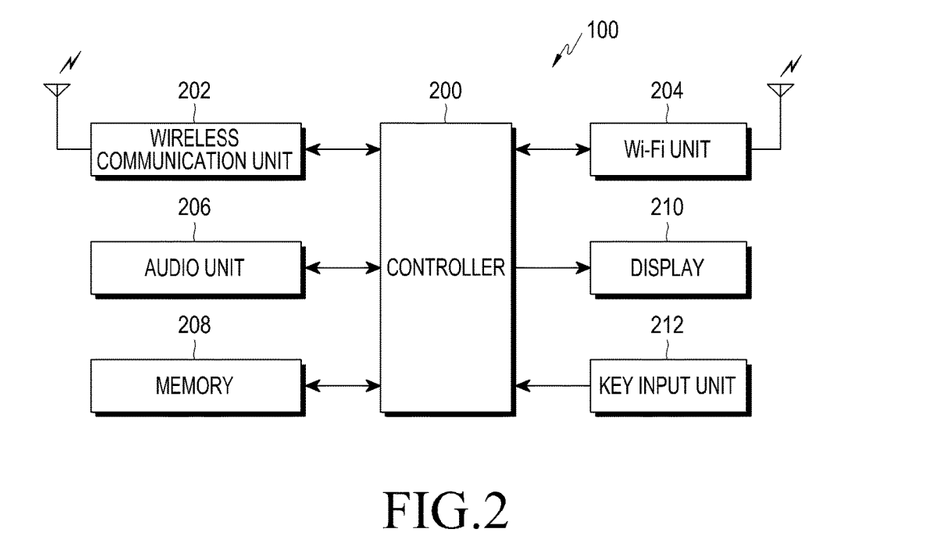
FIG. 2 is a block diagram illustrating a host device according to an exemplary embodiment of the present disclosure.

FIG. 2 is a block diagram illustrating a host device according to an exemplary embodiment of the present disclosure.

Referring to FIG. 2, the host device 100 is a mobile terminal, such as a smart phone, and may include a controller 200, a wireless communication unit 202, a Wi-Fi unit 204, an audio unit 206, a memory 208, a display 210, and a key input unit 212.

The wireless communication unit 202 performs wireless data communication with the wireless data network 106. The Wi-Fi unit 204, which is a wireless short-range communication unit, forms the mobile AP network 104 with at least one client device including the client device 102 based on Wi-Fi communication. The audio unit 206 includes an audio output device, such as a speaker, and an audio input device, such as a microphone, and inputs and outputs various audio signals corresponding to operations of the host device 100. The memory 208 stores a program for operations of the controller 200 and stores various data according to the operations of the controller 200. The memory 208 may further include an external memory and a storage device, such as a Hard Disk Drive (HDD). The display 210 displays images according to the operations of the controller 200. The key input unit 212 provides various key inputs used for operations of the host device 100 from the user to the controller 200. The key input unit 212 may include a touch screen panel installed on the display 210 and may include keys for inputting numeric and character information and function keys for setting various functions. The controller 200 controls the wireless communication unit 202, the Wi-Fi unit 204, the audio unit 206, the memory 208, the display 210, and the key input unit 212 to perform various functions of the host device 100. To implement the controller 200, an application processor, which is a general main controller of a mobile terminal, may additionally execute a function of controlling use of an external data network.

Figure 3:
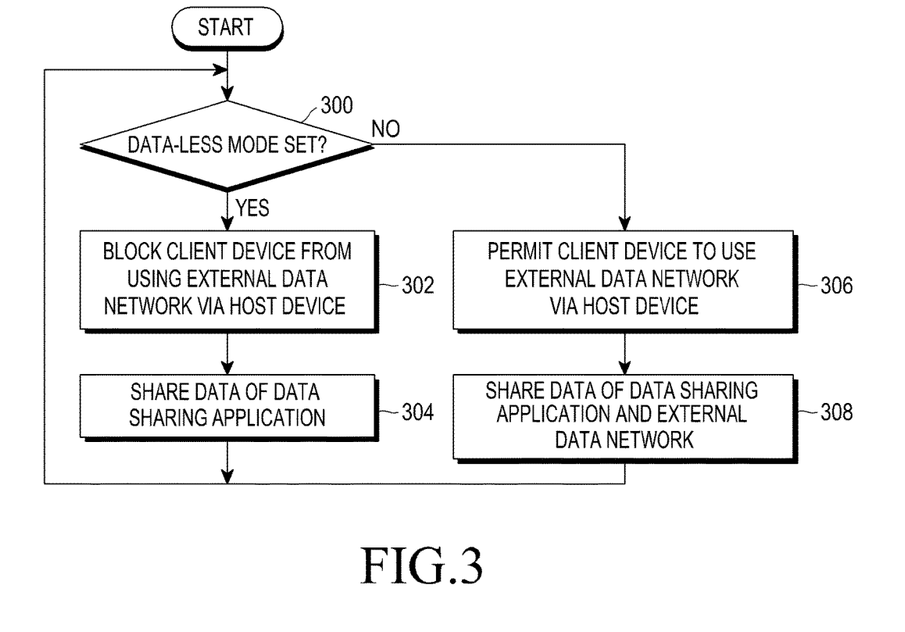
FIG. 3 is a flowchart of a host device according to an exemplary embodiment of the present disclosure.

FIG. 3 is a flowchart of a host device according to an exemplary embodiment of the present disclosure.

Referring to FIG. 3, once the controller 200 of the host device 100 starts a mobile AP operation, the controller 200 determines whether a data-less mode is set in step 300. If it is determined that the data-less mode is set in step 300, the controller 200 blocks the client device 102 from using an external data network via the host device 100 in step 302. Thus, in step 304, the client device 102 shares data of a data sharing application with the host device 100, but cannot use the external data network.

If it is determined that the data-less mode is not set in step 300, the controller 200 permits the client device 102 to use the external data network via the host device 100 in step 306. Thus, in step 308, the client device 102 shares not only the data of the data sharing application, but also the external data network with the host device 100.

Figure 4:
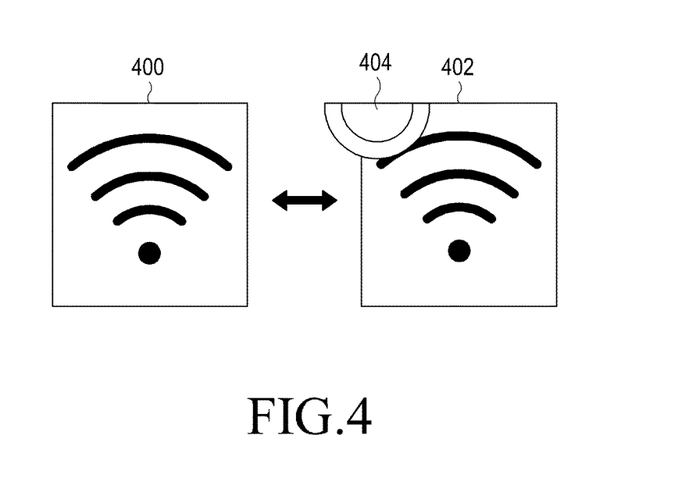
FIG. 4 is a diagram illustrating a data-less mode setting state in a host device according to an exemplary embodiment of the present disclosure.

The controller 200 may indicate a data-less mode setting state using a mobile AP indicator displayed on the display 210 as illustrated in FIG. 4.

FIG. 4 is a diagram illustrating a data-less mode setting state in a host device according to an exemplary embodiment of the present disclosure.

Referring to FIG. 4, reference numeral 400 indicates a mobile AP indicator when the data-less mode is released, and reference numeral 402 indicates a mobile AP indicator when the data-less mode is set. When the data-less mode is set, the mobile AP indicator 402 includes a data-less mode icon 404 indicating that the host device 100 is in the data-less mode. A form or color of the data-less mode icon 404 may be implemented differently than illustrated in FIG. 4. In this state, if the data-less mode is released, the data-less mode icon 404 disappears as in the mobile AP indicator 400. Thus, the user of the host device 100 may be aware of whether the data-less mode is set.

Setting or releasing the data-less mode for the host device 100 may be performed by the user of the host device 100. For example, an item for setting and releasing the data-less mode may be added to a general environment setting menu of a mobile terminal to allow the user to set or release the data-less mode through the key input unit 212 of the host device 100. The data-less mode may also be manually or automatically set and released by a common carrier with which the host device 100 is registered or externally set.

The data-less mode may also be automatically set according to driving of the data sharing application and driving of the mobile AP. For example, if the mobile AP is driven after driving of the data sharing application or the data sharing application is selected during driving of the mobile AP, the data-less mode may be automatically set.

An allowed use amount may be set to limit use of an external data network for each client device, or an allowed use amount may be set to limit use of an external data network for each data sharing application. For example, an allowed use amount may be set for at least one of each client and each data sharing application. The allowed use amount may be set by the user of the host device or a common carrier with which the host device 100 is registered or may be manually or automatically set by external setting.

Figure 5:
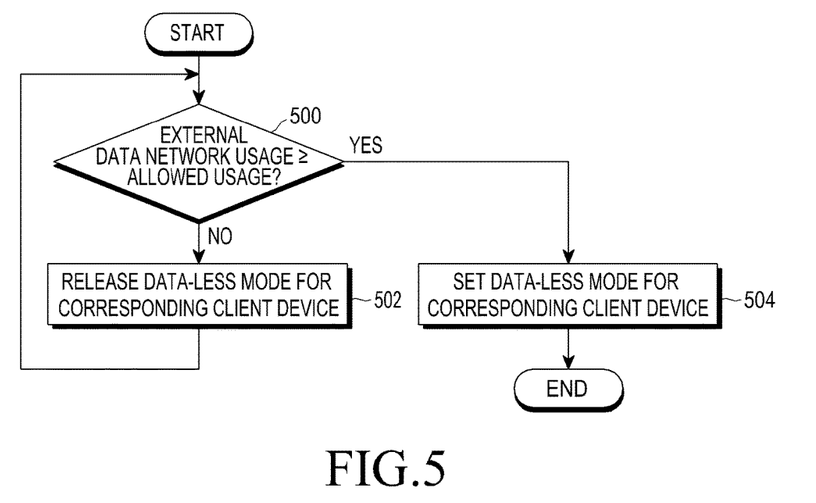
FIG. 5 is a flowchart illustrating a data-less mode control of a host device according to an exemplary embodiment of the present disclosure.

FIG. 5 is a flowchart illustrating a data-less mode control of a host device according to an exemplary embodiment of the present disclosure.

Referring to FIG. 5, an allowed use amount of an external data network is set for each client device. The controller 200 of the host device 100 determines whether the amount of use of an external data network (or an external data network usage) of the client device 102 reaches an allowed usage in step 500. If the external data network usage is less than the allowed usage, the controller 200 releases the data-less mode with respect to the client device 102 in step 502. On the other hand, if the external data network usage reaches the allowed usage in step 500, the controller 200 sets the data-less mode for the client device 102 in step 504.

Hence, before the external data network usage of the client device 102 reaches the allowed usage, the client device 102 is permitted to use the external data network. However, if the external data network usage of the client device 102 reaches the allowed usage, the client device 102 is blocked from using the external data network.

While the foregoing description made with reference to FIG. 5 uses one client device 102 as an example, the process illustrated in FIG. 5 is performed for each client device when at least one client device as well as the client device 102 are included in the mobile AP network 104.

Figure 6:
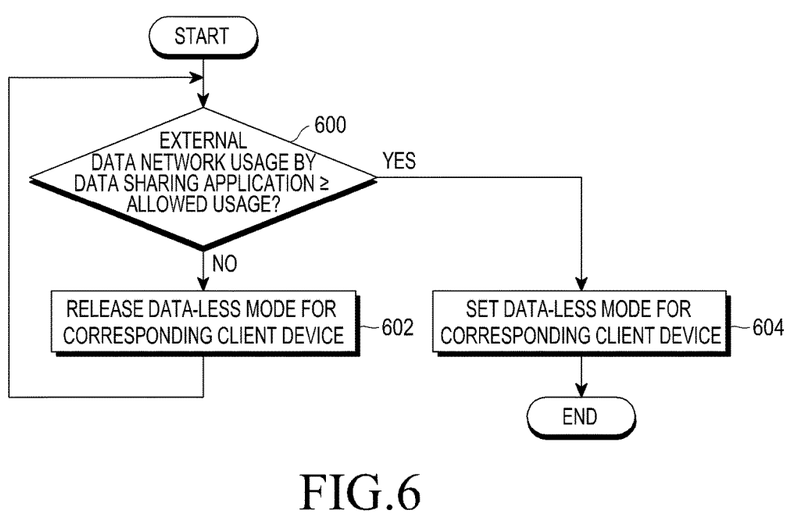
FIG. 6 is a flowchart illustrating a data-less mode control of a host device according to an exemplary embodiment of the present disclosure.

FIG. 6 is a flowchart illustrating a data-less mode control of a host device according to an exemplary embodiment of the present disclosure.

Referring to FIG. 6, an allowed usage is set for each data sharing application. The controller 200 of the host device 100 determines whether the external data network usage of the client device 102 by the current data sharing application reaches the allowed usage in step 600. If the external data network usage of the client device 102 by the current data sharing application is less than the allowed usage, the controller 200 releases the data-less mode for the client device 102 in step 602. On the other hand, if the external data network usage of the client device 102 by the current data sharing application reaches the allowed usage, the controller 200 sets the data-less mode for the client device 102 in step 604.

Hence, before the external data network usage of the client device 102 by the each data sharing application reaches the allowed usage, the client device 102 is permitted to use the external data network. However, if the external data network usage of the client device 102 by the each data sharing application reaches the allowed usage, the client device 102 is blocked from using the external data network.

While the foregoing description made with reference to FIG. 6 uses one client device 102 as an example, the process illustrated in FIG. 6 may be performed for each client device for each data sharing application when at least one client device as well as the client device 102 are included in the mobile AP network 104.

Controlling the use of the external data network by the client device 102 may be autonomously performed with respect to the client device 102. For example, depending on at least one of whether a data sharing application mode is set and whether the data-less mode is set for the host device 100, the use of the external data network by the client device 102 may be controlled, as will be described below with reference to FIGS. 7 through 9.

Figure 7:
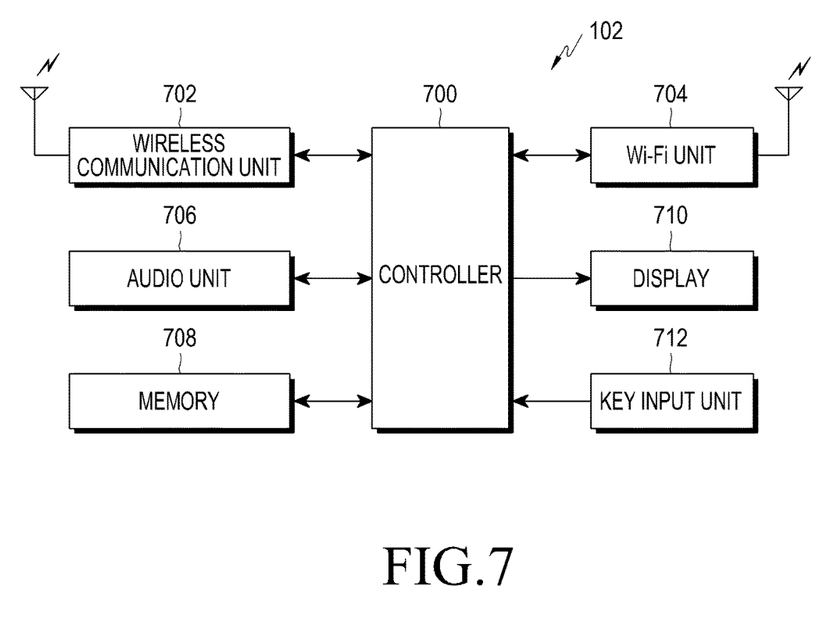
FIG. 7 is a block diagram illustrating a client device according to an exemplary embodiment of the present disclosure.

FIG. 7 is a block diagram illustrating a client device according to an exemplary embodiment of the present disclosure.

Referring to FIG. 7, the client device 102 is a mobile terminal, such as a smart phone, and includes a controller 700, a wireless communication unit 702, a Wi-Fi unit 704, an audio unit 706, a memory 708, a display 710, and a key input unit 712.

The wireless communication unit 702 performs a wireless data communication with a wireless data network (not shown) with which the client device 102 is registered. The Wi-Fi unit 704, which is a wireless short-range communication unit, forms the mobile AP network 104 with the host device 100 set as the mobile AP based on Wi-Fi communication. The audio unit 706 includes an audio output device, such as a speaker, and an audio input device, such as a microphone, and inputs and outputs various audio signals according to operations of the client device 203. The memory 708 stores a program for operations of the controller 700 and stores various data according to the operations of the controller 700. The memory 708 may further include an external memory and a storage device, such as an HDD. The display 710 displays images according to the operations of the controller 700. The key input unit 712 provides various key inputs used for operations of the client device 102 from the user to the controller 700. The key input unit 712 may include a touch screen panel installed on the display 710 and may include keys for inputting numeric and character information and function keys for setting various functions. The controller 700 controls the wireless communication unit 702, the Wi-Fi unit 704, the audio unit 206, the memory 708, the display 710, and the key input unit 712 to perform various functions of the host device 700. To implement the controller 700, an application processor, which is a general main controller of a mobile terminal, may additionally execute a function of controlling use of an external data network.

Figure 8:
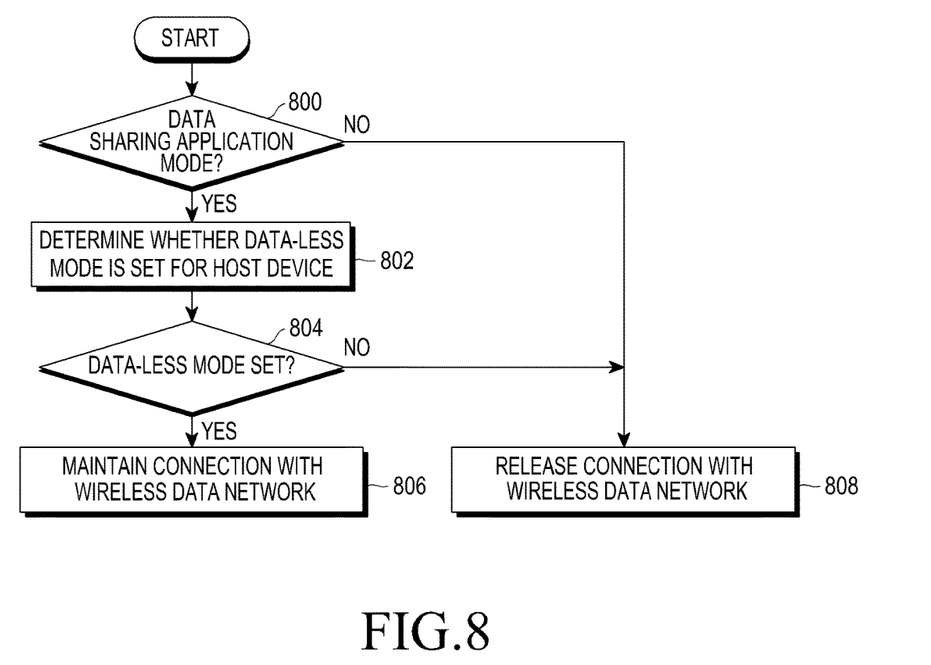
FIG. 8 is a flowchart of a client device according to an exemplary embodiment of the present disclosure.

FIG. 8 is a flowchart of a client device according to an exemplary embodiment of the present disclosure.

Referring to FIG. 8, when the controller 700 of the client device 102 is connected by the wireless communication unit 702 to a wireless data network with which the client device 102 is registered, if the controller 700 is connected to the host device 100, the controller 700 determines whether a current operation mode is a data sharing application mode in step 800. If the current operation mode is the data sharing application mode, the controller 700 determines whether the data-less mode is set for the host device 100 in step 802.

For example, the controller 700 performs a ping operation with respect to a particular web page through the host device 100 to determine whether the data-less mode is set for the host device 100. The particular web page may be one of a web page which the client device 102 has accessed most recently, a web page which the client device 102 visits most frequently, and a web page which is set as a homepage. The controller 700 performs a ping operation by using one of Hyper Text Transfer Protocol (HTTP) addresses of those web pages, and determines whether the data-less mode is set for the host device 100 based on whether a response is received to the ping operation. If a response is not received to the ping operation, it means the use of the external data network via the host device 100 is blocked, such that the controller 700 determines that the data-less mode is set. If a response is received to the ping operation, it means that the use of the external data network via the host device 100 is permitted, such that the controller 700 determines that the data-less mode is released.

In another example, the controller 700 may perform the ping operation with respect to a preset external network server via the host device 100 and determine whether the data-less mode is set for the host device 100, depending on whether a response is received to the ping operation. The preset external network server may be, for example, a particular server designated by a common carrier.

In another example, the controller 700 may be notified by the host device 100 of whether the data-less mode is set, and determine whether the data-less mode is set for the host device 100 based on the notification. To this end, the host device 100 notifies the client device 102 of whether the data-less mode is set. Such a notification operation may be performed when the client device 102 is connected to the host device 100.

As described above with reference to FIGS. 5 and 6, when an allowed usage of the external data network is set for each client device or each data sharing application, the host device 100 may notify the client device 102 of whether the data-less mode is set if the data-less mode is set or release for the client device 102. The host device 100 may notify the client device 102 of an allowed usage for the client device 102 or an allowed usage for a currently executed data sharing application mode. The host device 100 may notify the client device 102 of a current usage for the client device 102 or a current usage for the currently executed data sharing application mode. The client device 102 may inform the user of an allowed usage and a usage notified by the host device 100 by displaying them through the display 710. Before a usage reaches an allowed usage, for example, when the usage reaches 80% of the allowed usage, the client device 102 may inform the user of the usage by displaying a phrase regarding the usage through the display 710.

If it is determined that the data-less mode is set for the host device 100 in step 804, the controller 700 maintains connection with the wireless data network in step 806. Thus, data of the data sharing application is shared with the host device 100 via the Wi-Fi unit 704, but data communication, such as access to the Internet, is performed by using the wireless data network via the wireless communication unit 702. The data of the data sharing application may also be shared with another client device which may be connected to the mobile AP network 104. Therefore, when the client device 102 is connected to the host device 100 to use the data sharing application, if the host device 100 is set to the data-less mode, the client device 102 may continue accessing the Internet via a previously connected wireless data network.

On the other hand, if it is determined that the current operation mode is not the data sharing application mode in step 800 or the data-less mode is released in step 804, the controller 700 releases connection with the wireless data network in step 808. Therefore, if the current operation mode is the data sharing application mode and the data-less mode is released for the host device 100, the client device 102 may use the data sharing application and the external data network via the host device 100.

In FIG. 8, connection of the client device 102 to the existing wireless data network is maintained or released by determining whether the current operation mode is the data sharing application mode and whether the data-less mode is set for the host device 100. However, in an actual application of the present disclosure, connection of the client device 102 to the existing wireless data network may be maintained or released based on either whether the current operation mode is the data sharing application mode or whether the data-less mode is set for the host device 100. For example, in an actual application of the present disclosure, steps 802 and 804 may be skipped and step 806 or 808 may be performed after step 800. On the other hand, the process may start with step 802 while skipping step 800.

Figure 9:
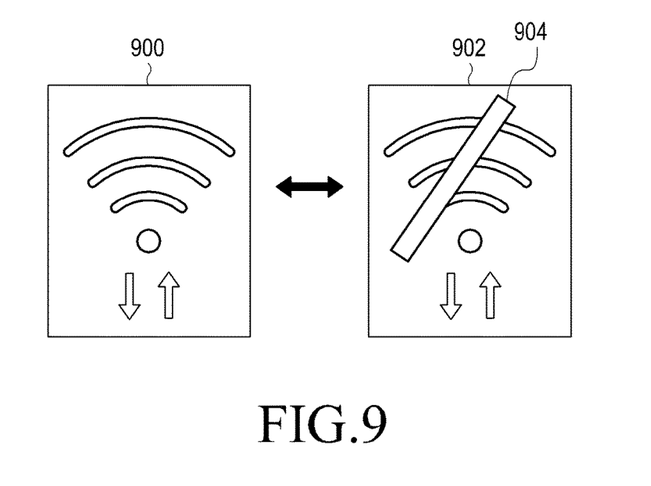
FIG. 9 is a diagram illustrating a data-less mode setting state in a client device according to an exemplary embodiment of the present disclosure.

FIG. 9 is a diagram illustrating a data-less mode setting state in a client device according to an exemplary embodiment of the present disclosure.

Referring to FIG. 9, reference numeral 900 indicates a mobile AP indicator when the data-less mode is released, and reference numeral 902 indicates a mobile AP indicator when the data-less mode is set. When the data-less mode is set, the mobile AP indicator 902 includes a data-less mode icon 904 indicating that the client device 102 is in the data-less mode. The form or color of the data-less mode icon 904 may be implemented differently than illustrated in FIG. 9. In this state, if the data-less mode is released, the data-less mode icon 904 disappears as in the mobile AP indicator 900. Thus, the user of the client device 102 may be aware of whether the data-less mode is set.

Setting and releasing the data-less mode for the host device 100 may be automatically performed according to a state of connection of the host device 100 to an external data network. For example, depending on whether the host device 100 subscribes to an unlimited data plan regarding the use of wireless data, the data-less mode may be automatically set or released. For example, if the host device 100 does not subscribe to the unlimited data plan, the data-less mode may be automatically set. Otherwise, if the host device 100 subscribes to the unlimited data plan, the data-less mode may be automatically released. As such, automatic setting or releasing of the data-less mode, according to whether the host device 100 subscribes to the unlimited data plan, may be performed by a common carrier to which the host device 100 subscribes. When the host device 100 may determine information regarding whether it subscribes to the unlimited data plan, automatic setting and releasing of the data-less mode may be performed by the host device 100 according to whether the host device 100 subscribes to the unlimited data plan.

In another example, as described with reference to FIG. 1, if the host device 100 may be connected to a fixed AP as well as the wireless data network 106, the data-less mode may be automatically set or released according to whether the host device 100 is connected to the fixed AP. This case will be described below with reference to FIGS. 10 through 12.

Figure 10:
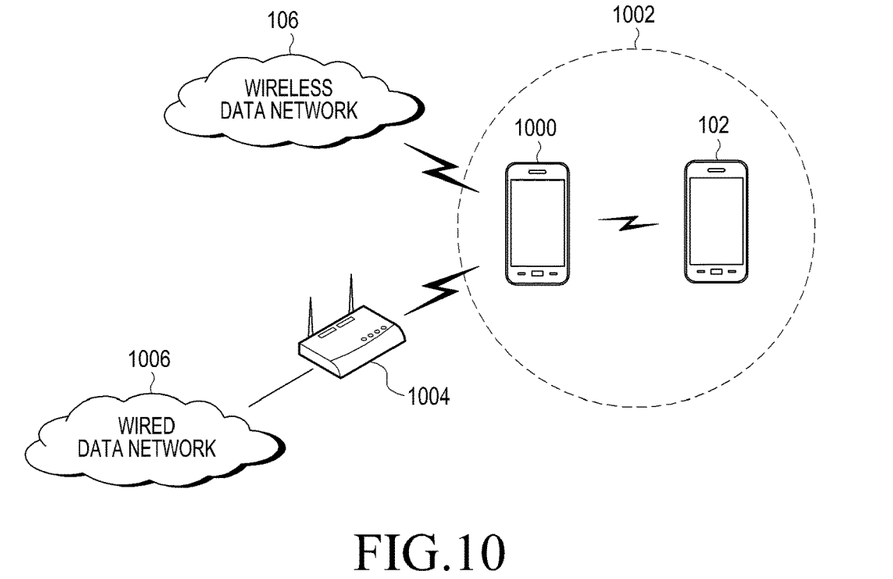
FIG. 10 is a structural diagram illustrating a mobile AP network according to an exemplary embodiment of the present disclosure.

FIG. 10 is a structural diagram illustrating a mobile AP network according to an exemplary embodiment of the present disclosure.

Referring to FIG. 10, a host device 1000 is connected to a fixed AP 1004 as well as the wireless data network 106. The host device 1000 corresponds to the host device 100 of FIG. 1. The fixed AP 1004 is connected to a wired data network 1006 and is also connected to the host device 1000 through a wireless short-range communication, such as a WLAN. In this case, the client device 102 included in an AP mobile network 1002 may also use the wired data network 1006 via the host device 1000. The wired data network 1006 via the fixed AP 1004 corresponds to an external data network other than a wireless data network with which the client device 102 is registered.

Figure 11:
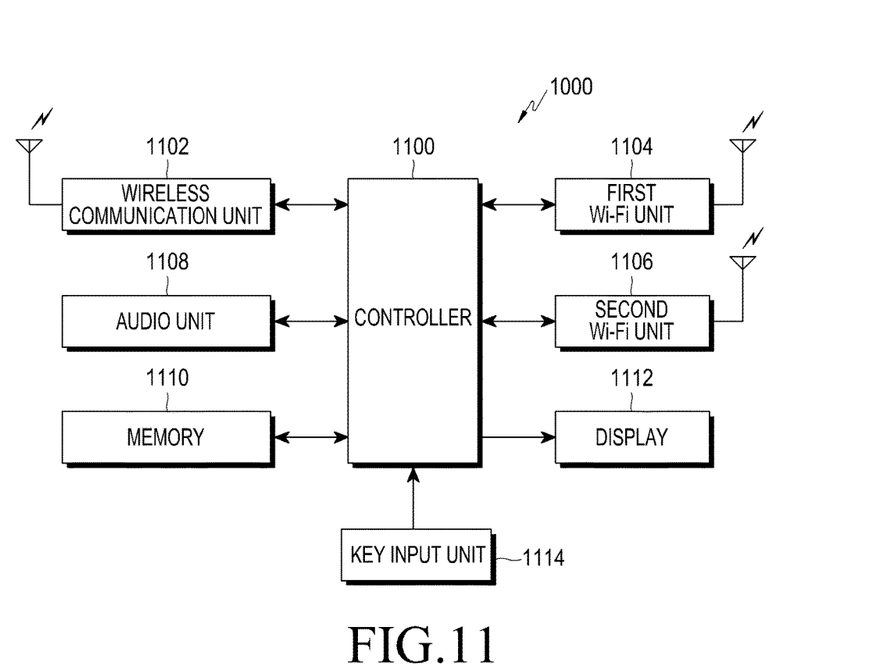
FIG. 11 is a block diagram illustrating a host device according to an exemplary embodiment of the present disclosure.

FIG. 11 is a block diagram illustrating a host device according to an exemplary embodiment of the present disclosure.

Referring to FIG. 11, the host device 1000 is a mobile terminal, such as a smart phone, and includes a controller 1100, a wireless communication unit 1102, a first Wi-Fi unit 1104, a second Wi-Fi unit 1106, an audio unit 1108, a memory 1110, a display 1112, and a key input unit 1114.

The wireless communication unit 1102 performs wireless data communication with the wireless data network 106. The first Wi-Fi unit 1104, which is a wireless short-range communication unit, forms a mobile AP network based on a Wi-Fi communication with at least one client device including the client device 102. The second Wi-Fi unit 1106, which is a wireless short-range communication unit, is connected with the fixed AP 1004 through a Wi-Fi communication. The audio unit 1108 includes an audio output device, such as a speaker, and an audio input device, such as a microphone, and inputs and outputs various audio signals according to operations of the host device 1000. The memory 1100 stores a program for operations of the controller 1100 and stores various data according to the operations of the controller 1100. The memory 1110 may further include an external memory and a storage device, such as an HDD. The display 1112 displays images according to the operations of the controller 1100. The key input unit 1114 provides various key inputs used for operations of the host device 1000 from the user to the controller 1100. The key input unit 1114 may include a touch screen panel installed on the display 1112 and may include keys for inputting numeric and character information and function keys for setting various functions. The controller 1100 controls the wireless communication unit 1102, the first Wi-Fi unit 1104, the second Wi-Fi unit 1106, the audio unit 1108, the memory 1110, the display 1112, and the key input unit 1114 to perform various functions of the host device 1000. To implement the controller 1100, an application processor, which is a general main controller of a mobile terminal, may additionally execute a function of controlling use of an external data network.

Figure 12:
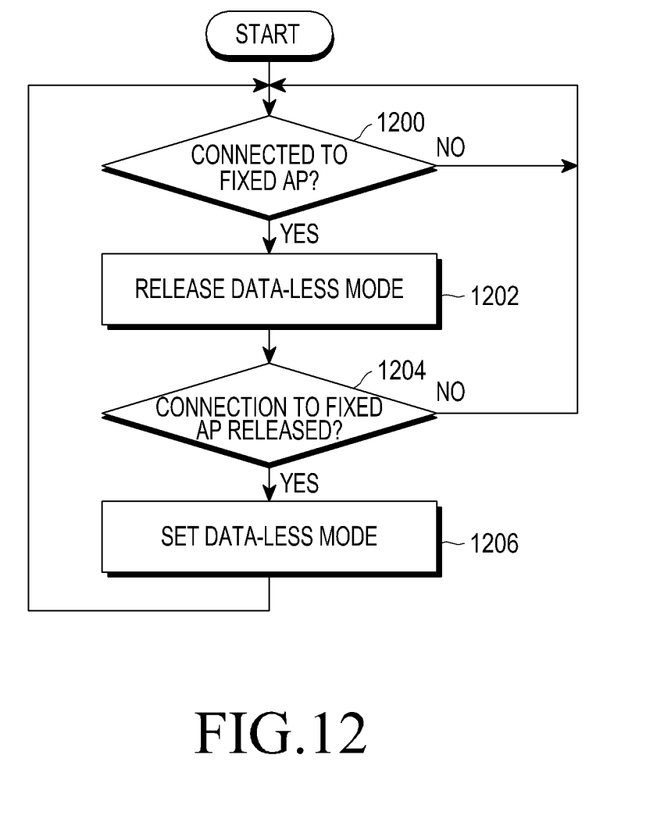
FIG. 12 is a flowchart illustrating a data-less mode control of a host device according to an exemplary embodiment of the present disclosure.

FIG. 12 is a flowchart illustrating a data-less mode control of a host device according to an exemplary embodiment of the present disclosure.

Referring to FIG. 12, the controller 1100 of the host device 1000 determines whether the host device 1000 is connected to the fixed AP 1004 through the second Wi-Fi unit 1106 in step 1200. If it is determined that the host device 1000 is connected to the fixed AP 1004, the controller 1100 releases the data-less mode in step 1202. The controller 1100 determines whether connection with the fixed AP 1004 is released in step 1204. If it is determined that connection with the fixed AP 1004 is released, the controller 1100 sets the data-less mode in step 1206.

In this way, setting and releasing of the data-less mode for the host device 1000 are performed automatically according to a state of connection of the host device 1000 to an external data network.

As is apparent from the foregoing description, when the client device is connected to the mobile AP, use of an external data network (or external data network use) of the client device via the mobile AP is selectively permitted or blocked by at least one of the host device and the client device, thereby preventing the host device from being excessively charged an unnecessary additional wireless data fee. Moreover, when external data network use of the client device via the mobile AP is blocked, the client device maintains connection to the wireless data network with which the client device is registered, allowing access to the Internet.

The mobile terminal may download or install and execute a program (for example, an application) for controlling use of an external data network from a program providing device (for example, a server) located in a remote place, thereby using the program to control use of the external data network. For example, once the program for controlling use of the external data network is installed in the mobile terminal, the program may be executed in the mobile terminal to control use of the external data network. The program providing device transmits the program to the mobile terminal automatically or in response to a transmit request for the program from the mobile terminal. The program providing device may additionally perform service subscription determination, user authentication, and payment information checking with respect to the mobile terminal. The program providing device may include a communication unit for performing a wired or a wireless communication with the mobile terminal, a storage medium for storing the program, and a controller for transmitting the program to the mobile terminal through the communication unit. The storage medium may be located inside or outside the program providing device.

It can be seen that exemplary embodiments of the present disclosure can be implemented with hardware, software, or a combination of hardware and software. Such arbitrary software may be stored, whether or not erasable or re-recordable, in a volatile or non-volatile storage, such as a Read-Only Memory (ROM) a Random Access Memory (RAM), an optically or magnetically recordable and machine-readable storage medium, such as a Compact Disc (CD), a Digital Versatile Disk (DVD), a magnetic disk, a magnetic tape, or the like.

It will be appreciated that the storage devices and storage media are embodiments of machine-readable (e.g. computer-readable) storage that are suitable for storing one or more programs comprising instructions or code that, when executed, implement embodiments of the present invention. Accordingly, certain embodiments of the present invention provide a program comprising instructions or code for implementing a system, apparatus and/or method according to any aspect, claims or embodiment disclosed herein, and a machine-readable storage storing such a program. Such a program may be electronically transferred through an arbitrary medium, such as a communication signal delivered through a wired or a wireless connection, and an exemplary embodiment of the present disclosure properly includes equivalents thereof.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable communication device comprising:
   first communication circuitry to support a first communication protocol;
   second communication circuitry to support a second communication protocol;

a memory configured to store content and an application for sharing the content with an external electronic device; and a processor configured to:
- identify a user input received with respect to the application,
- in response to identifying the user input, control the first communication circuitry to establish a first communication connection with the external electronic device to share the content using the first communication protocol,
- control the second communication circuitry to establish a second communication connection with an external network using the second communication protocol, and
- control the second communication connection to disallow the external electronic device to access the external network via the portable communication device while the second communication connection established between the portable communication device and the external network is maintained, based at least in part on the portable communication device operating in a mode of the portable communication device for limiting an access of the external electronic device to the external network via the portable communication device,
- wherein the mode is set based on the application being executed in the portable communication device and the external electronic device.

2. The portable communication device of claim 1, wherein the processor is further configured to:
- control the first communication circuitry to establish the first communication connection using a short range communication protocol as at least part of the first communication protocol, and
- control the second communication circuitry to establish the second communication connection using a non-short range communication protocol as at least part of the second communication protocol.

3. The portable communication device of claim 1, wherein the processor is further configured to set the portable communication device as a host device of the first communication connection and set the external electronic device as a client device of the first communication connection, as at least part of the establishing of the first communication connection.

4. The portable communication device of claim 1, wherein the processor is further configured to identify the portable communication device as a mobile access point and identify the external electronic device as a tethered device, as at least part of the establishing of the first communication connection.

5. The portable communication device of claim 1, wherein the processor is further configured to block sharing of the second communication connection such that the external electronic device cannot use the second communication connection to communicate with the external network.

6. The portable communication device of claim 5, wherein the processor is further configured to communicate with another device external to the portable communication device via the second communication connection while the sharing of the second communication connection is blocked.

7. The portable communication device of claim 5, wherein the processor is further configured to refrain from the blocking based at least in part on the first communication connection being released.

8. The portable communication device of claim 1, further comprising:
a display,
wherein the processor is further configured to, based on the application being executed, present a notification via the display.

9. The portable communication device of claim 1, further comprising:
audio circuitry,
wherein the processor is further configured to receive an audio signal via the audio circuitry as at least part of the user input.

10. The portable communication device of claim 1, wherein the processor is further configured to control to establish, as at least part of the second communication connection, a communication channel between the application executed in the portable communication device and the application executed in the external electronic device.

11. The portable communication device of claim 1, wherein the mode is related to the second communication connection.

12. The portable communication device of claim 1, wherein the processor is further configured to control the second communication connection to allow the external electronic device to access the external network via the portable communication device, based at least in part on the mode being released.

13. The portable communication device of claim 1, wherein the processor is further configured to identify at least one of a wireless local area network, a Wi-Fi, a bluetooth, a bluetooth low energy, a near field communication, or a radio frequency identification, as at least part of the second communication protocol.

14. A method of controlling a portable communication device, the method comprising:
- receiving, at the portable communication device, a user input with respect to an application to share content with an external electronic device;
- in response to receiving the user input, controlling to establish a first communication connection with the external electronic device to share the content using a short range communication protocol;
- controlling to establish a second communication connection with an external network using a non-short range communication protocol; and
- controlling, at the portable communication device, the second communication connection to disallow the external electronic device to access the external network via the portable communication device while the second communication connection established between the portable communication device and the external network is maintained, based at least in part on the portable communication device operating in a mode of the portable communication device for limiting an access of the external electronic device to the external network via the portable communication device,
- wherein the mode is set based on the application being executed in the portable communication device and the external electronic device.

15. The method of claim 14, wherein the establishing of the first communication connection comprises:
- setting, at the portable communication device, the portable communication device as a host device of the first communication connection; and
- setting, at the portable communication device, the external electronic device as a client device of the first communication connection.

16. The method of claim 14, further comprising:
communicating, at the portable communication device, with another device external to the portable communication device via the second communication connection while sharing of the second communication connection is blocked.

17. The method of claim 16, further comprising:
blocking sharing of the second communication connection based at least in part on the mode being set or
refraining from the blocking based at least in part on the first communication connection being released.

18. The method of claim 14, further comprising:
controlling to establish, as at least part of the second communication connection, a communication channel between the application executed in the portable communication device and the application executed in the external electronic device.

19. The method of claim 14, wherein the mode is related to the second communication connection.

20. A non-transitory machine-readable storage device storing instructions executable by one or more processors of a portable communication device to cause the one or more processors to perform operations comprising:

receiving, at the portable communication device, a user input with respect to an application to share content with an external electronic device;
in response to receiving the user input, controlling to establish a first communication connection with the external electronic device to share the content using a short range communication protocol;
controlling to establish a second communication connection with an external network using the second communication protocol; and
controlling, at the portable communication device, the second communication connection to disallow the external electronic device to access the external network via the portable communication device while the second communication connection established between the portable communication device and the external network is maintained, based at least in part on the portable communication device operating in a mode of the portable communication device for limiting an access of the external electronic device to the external network via the portable communication device,
wherein the mode is set based on the application being executed in the portable communication device and the external electronic device.

* * * * *